United States Patent
Kapil et al.

(10) Patent No.: US 6,941,345 B1
(45) Date of Patent: Sep. 6, 2005

(54) REAL-TIME, TEXT-BASED MESSAGING BETWEEN DEVICES IN PLURAL COMMUNITIES

(75) Inventors: Vivek Kapil, Lewisville, TX (US); John R. Stevens, Plano, TX (US); Alwarkurichi Nagaraj, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/454,689

(22) Filed: Dec. 3, 1999

(51) Int. Cl.[7] ............................................. G06F 15/16
(52) U.S. Cl. ...................... 709/206; 709/207; 709/228
(58) Field of Search ................................ 709/223–229, 709/206, 204, 236, 207; 379/202; 345/330, 345/352; 348/13; 380/25; 395/200.54

(56) References Cited

U.S. PATENT DOCUMENTS

| | | | |
|---|---|---|---|
| 5,764,916 A * | 6/1998 | Busey et al. ................. | 709/227 |
| 5,943,478 A * | 8/1999 | Aggarwal et al. ........... | 709/229 |
| 6,038,602 A * | 3/2000 | Ishikawa ..................... | 709/227 |
| 6,052,121 A * | 4/2000 | Webster | |
| 6,212,548 B1 * | 4/2001 | DeSimone et al. | |
| 6,415,318 B1 * | 7/2002 | Aggarwal et al. ........... | 709/206 |
| 6,430,604 B1 * | 8/2002 | Ogle et al. .................. | 709/207 |
| 6,549,937 B1 * | 4/2003 | Auerbach et al. ........... | 709/206 |

FOREIGN PATENT DOCUMENTS

WO   WO 00/69140   11/2000

OTHER PUBLICATIONS

"Chatting," printed from the website http://www.parkland.cc.il.us/toolbox/firstclass/chatting.html, pp. 1-2, dated at least as early as Sep. 1, 1999.
U. Gall et al. *Promondia: a Java-based framework for real-time group communication in the Web*, Computer Networks and ISDN Systems, North Holland, vol. 29, No. 8-13, Sep. 1, 1997, pp. 917-926.

\* cited by examiner

*Primary Examiner*—Patrice Winder
(74) *Attorney, Agent, or Firm*—Trop, Pruner & Hu, P.C.

(57) ABSTRACT

A communications system includes a plurality of communities each associated with a service provider. Text-based messaging sessions, such as chat sessions, may be established between users in the communities. A request is received from a user in a first community, the request indicating a desired text-based messaging session with a user in a second community. The user in the second community is notified of a request, and it is determined if the user has accepted the request to establish a text-based messaging session. If so, the text-based messaging session is established between users in the first and second communities. If the user is not available, predetermined information stored in a server may be accessed to determine a plurality of devices that may be employed for communicating with the user. A message is sent to at least a selected one of the plurality of devices.

27 Claims, 10 Drawing Sheets

REAL-TIME, TEXT-BASED MESSAGING BETWEEN DEVICES IN PLURAL COMMUNITIES

BACKGROUND

The invention relates to messaging between terminals in different communities, such as communities served by different service providers.

The increased availability of data networks, such as the Internet or intranets, has increased accessibility among nodes coupled to the data networks. Example communications across such data networks include electronic mail, file transfer, web browsing, and other exchanges of data.

Electronic forms of communications between users over data networks include electronic mail and text chat sessions. However, in using electronic mail, there typically exists some delay in getting a response from a destination user. The delay includes the amount of time for the electronic mail message to get from the originating user to the destination user, the time a user takes to respond to the electronic mail message, and the time to propagate the response message back to the originating user. A destination user may not be sitting at his or her station, or the user may decide not to answer electronic mail until some later time. The originating user does not receive any indication of this, typically having to wait for a response, which may come much later. Further, with some forms of electronic mail messaging, confirmation of receipt of the message is typically not provided.

A more real-time mechanism of communicating between users is provided by chat sessions or instant messaging, available from entities such as Yahoo! Inc. and America Online, Inc. Both instant messaging and chat sessions are communications services that allow two or more individuals to establish real-time communications sessions. Chat sessions may occur in "chat rooms," which are public on-line locations where persons having common interests may chat (using text). Instant messaging provides a private text communications session and includes programs that alert a user if someone on the user's list of individuals is on-line. A chat session can then be initiated with that person. Typically, to establish a chat or instant messaging session, users may have to log on to a third party server, referred to as a chat server in some arrangements. Alternatively, chat or instant messaging sessions are available between users that subscribe to the same service provider, which in effect provides the common server or servers for the users. Without a centralized server through which users are logged into, chat or instant messaging may not be available.

In addition, if a destination user is not logged on to a predetermined server, then that user is basically unavailable over data networks at that time. The originating user is then left with using other types of communication devices to contact the destination user, such as by using a wireline telephone or a wireless telephone.

A need thus exists for a more robust method and apparatus for communicating over data networks.

SUMMARY

In general, according to one embodiment, a method of establishing a text-based messaging session includes receiving a request from an entity in a first community, the request indicating a desired text-based messaging session with a user in a second community. The user in the second community is notified of a request, and it is determined if the user has accepted the request to establish a text-based messaging session.

In general, according to another embodiment, a method of communicating in a system having a server includes receiving, at the server, a request to access a user. Predetermined information is accessed to determine a plurality of devices that may be employed for communicating with the user. A message is sent to at least a selected one of the plurality of devices.

Some embodiments of the invention may include one or more of the following advantages. Messaging and text-based communications sessions between users in different communities may be performed, in which the different communities may be served by different service providers. In addition, the ability to select one of a plurality of devices through which an individual is to be contacted in response to a contact request provides flexibility in contacting that individual. If the individual is unavailable at a first device, another device may be accessed automatically to try to reach the individual. Also, a user has the option of selecting one or more devices in some preference order through which he or she is to be contacted.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
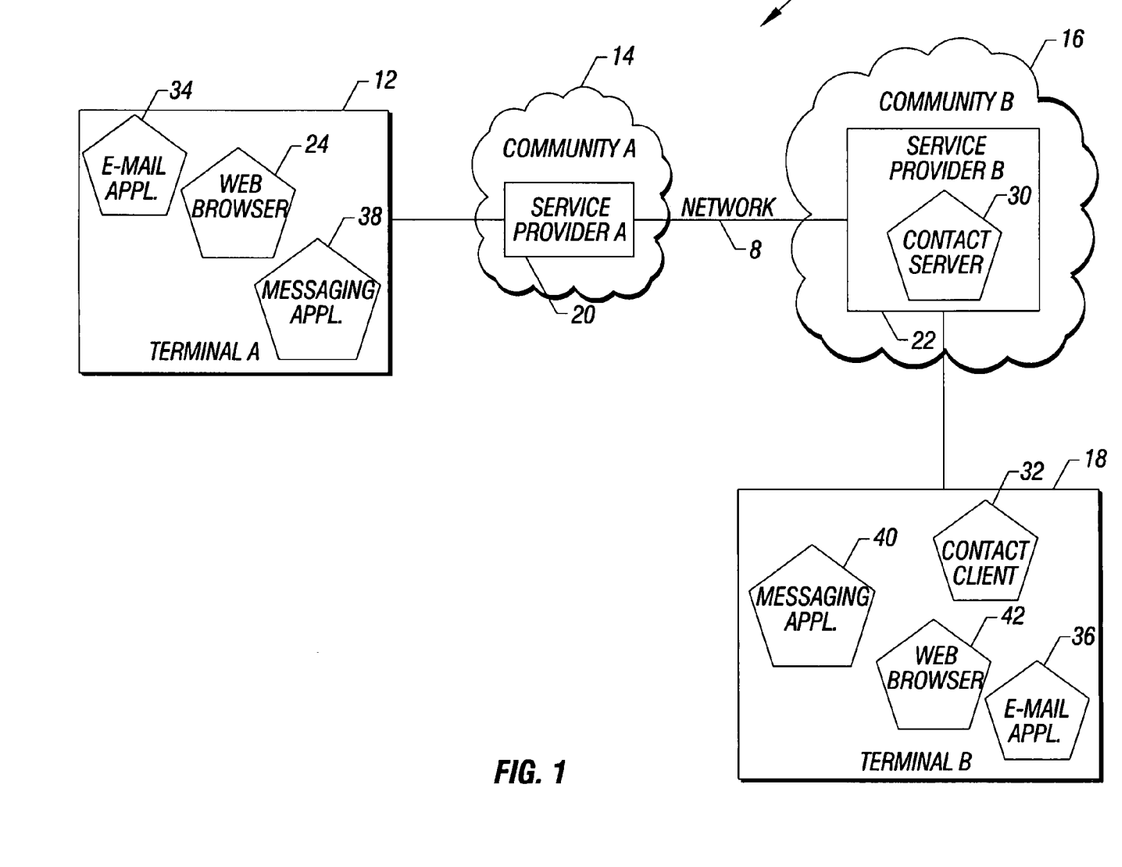
FIG. 1 is a block diagram of an embodiment of a communications system in which inter-community text-based communications may occur between terminals coupled to different communities or networks.

Referring to FIG. 1, a communications system 10 in accordance with one embodiment includes a plurality of communities, with a first community 14 and a second community 16 shown. The communities 14 and 16 are serviced by service providers 20 and 22, respectively, and are coupled by a network 8. A "network" may refer to one or more communications networks, links, channels, or paths.

A "community" refers to a group of terminals or users that are served by a service provider. A service provider controls access to certain networks for terminals and users in the served community. The service provider also may determine the types of services that a user or terminal has subscribed to. A service provider includes one or more server systems that terminals (desktop and mobile units) may be linked to. Such server systems include hardware and software components that perform service provider tasks. A subscriber, through a terminal, may be logged on to a server system to establish a link to the server system. When the subscriber is logged on a server system of the service provider, he or she has an established link with the service provider over which communications between the server system and terminal may occur. When the subscriber is not logged on, the communications link is not active. Logging on to a server refers to providing some type of an identifier, usually in the form of a user name and password, to identify a user or terminal with the server so that a session can be started on the server. Thus, for example, logging on to a server of an Internet service provider allows a subscriber access the Internet.

Various application routines may reside in the terminal 12 to enable access to the network 8. For example, a web browser 24 may be used to browse web pages. An electronic mail application 34 may be used to send and receive electronic mail to users coupled to the Internet or an intranet. A messaging application 38 may be used to establish a chat session or a messaging session with another user on the network 8. In the illustrated embodiment, terminal 12 is associated with user A.

The service provider 22 may also be coupled to terminals, such as terminal 18. The terminal 18 may similarly include a web browser 42, an electronic mail application 36, and a messaging application 40. Other application routines for communicating or obtaining services on the network may also be available. In the illustrated embodiment, user B is associated with the terminal 18.

In accordance with some embodiments, "real-time" inter-community text-based messaging or communications may be performed between terminals in different communities, such as communities 14 and 16 served by service providers 20 and 22, respectively. As used here, "real-time" messaging communications refer to messaging or communications in which some interaction (in the form of exchange of text or other types of viewable messages) is occurring between at least two end users who have acknowledged each other's participation in the session. This is distinguished from traditional electronic mail messaging, in which an interactive session is not established between users. A "text-based" messaging or communications session is one in which users or terminals exchange text or other forms of visual data to communicate.

As an example, the terminal 12 that is part of the first community 14 may establish a real-time text-based messaging or communications session with the terminal 18 which is part of the second community 16. According to one embodiment, user A on the terminal 12 may access a location of a contact server 30 (e.g., a web page) provided by the service provider 22. In one embodiment, the contact server 30 may include a Common Gateway Interface (CGI) program, as described in the CGI Specification, Version 1.1. In this embodiment, user A on terminal 12 retrieves a web page from the contact server 30, from which the user can indicate that he or she desires to contact user B on the second terminal 18 in the second community 16. The CGI program in the contact server 30 processes the request to determine if user B exists, is a valid subscriber, and logged on to the service provider 22.

Another technique of establishing inter-community messaging is to send requests according to a version of Simple Mail Transfer Protocol (SMTP), as described in Request for Comments (RFC) 821, entitled "Simple Mail Transfer Protocol," dated August 1982. In this arrangement, user A on the terminal 12 may request a messaging or communications session with user B in the second community 16 by initiating a request through user A's service provider 20. In response, the service provider 20 adds the request to its list of contact requests terminating to users outside its domain. The service provider 20 then sends a request to the service provider 22 in the second community 16.

In either arrangement, the contact server 30 may send a message to a contact client 32 in user B's terminal 18 to indicate that user A has made the request. The notification may be in the form of a pop-up screen or other indication (audio and/or video) at user B's terminal 18.

In another embodiment, contact servers and contact clients may be distributed across different service providers and different terminals. For example, in FIG. 1, in this distributed architecture, a contact client may be included in each of the terminals 12 and 18 and contact servers may be included in each of the service providers 20 and 22. In this architecture, to establish a real-time messaging or communications session, user A at the terminal 12 in the first community 14 may start its copy of the contact client to enter the name of a desired destination user. The contact client in the terminal 12 then establishes communications with a contact server in the service provider 22 of the second community 16. The contact server in the second service provider 22 can then send a rejection indication to the contact client in the terminal 12 if communications is not possible (user B does not exist, is not available, or is not interested), or the contact server may establish communications with the contact client in the terminal 18. A similar procedure is provided by contact clients in the terminals and the contact server in the service provider 20 of the first community 14 if user B wishes to contact user A.

Figure 2:
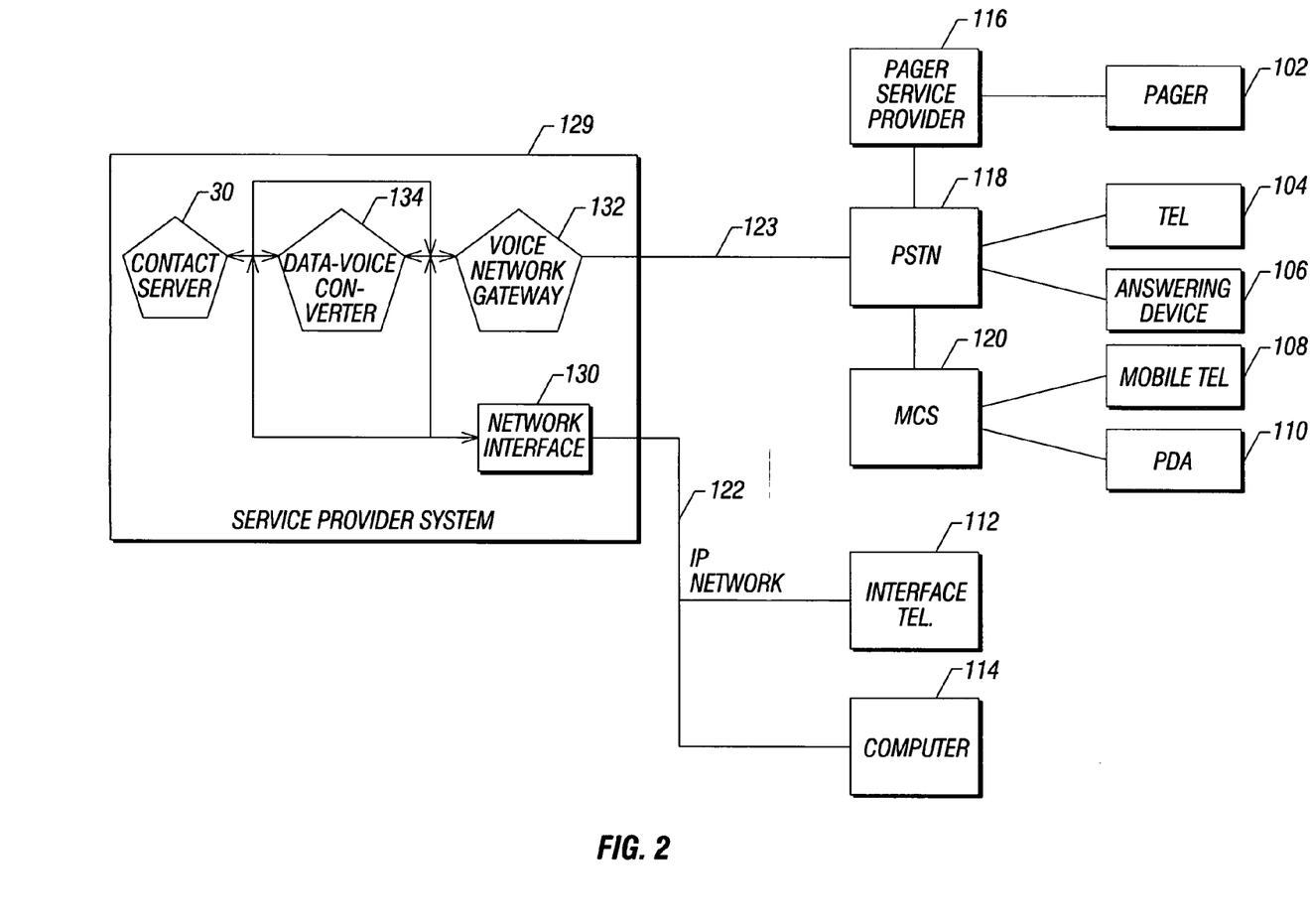
FIG. 2 is a block diagram of a plurality of communications devices that a service provider associated with a destination user is capable of contacting.

In addition to the ability to establish real-time text-based messaging or communications sessions, some embodiments of the invention may also provide the ability to access one of a plurality of communication devices associated with a destination user through the service provider associated with the destination user. Thus, instead of only the terminal at which the destination user is associated with, the service provider may also access the other devices. Referring to FIG. 2, examples of such communications devices include a pager 102, a wireline telephone 104, an answering device 106, a mobile unit 108, a mobile personal digital assistant (PDA) 110, and other devices. The pager 102 is coupled to a pager service provider 116, which is capable of receiving a call request and transmitting messages to the pager 102 over a wireless link. The telephone 104 and answering device 106 may be coupled to a public switched telephone network (PSTN) 118, which controls communications between telephones wired to it. For mobile devices such as the mobile telephone 108 and the mobile PDA 110, a mobile switching center 120 controls communications between the mobile devices as well as between a mobile device and a wired unit coupled through the PSTN 118.

Communications devices may also be coupled to a packet-based data network, such as an IP (Internet Protocol) network 122. IP is described in RFC 791, entitled "Internet Protocol," dated September 1981. Other versions of IP, such as IPv6, or other packet-based protocols may be utilized in further embodiments. A version of IPv6 is described in RFC 2460, entitled "Internet Protocol, Version 6 (Ipv6) Specification," dated December 1998. A device that may be coupled to the data network 122 is a computer 114. Another device that may coupled over the data network 122 is an "Internet" telephone 112, which is a telephone that is capable of communicating voice over the packet-based data network 122. The computer 114, if equipped with speech processing capability, may also be able to communicate voice over the data network 122.

A system 129 that is part of a service provider (e.g., 22) may be capable of communicating with the multiple communication devices. The system 129 may include a network interface 130 for communicating with the data network 122, and a voice network gateway 132 for communicating with the PSTN 118 over a line 123 (e.g., a T1 line). Text messages from the contact server 30 may be converted into voice by a data-to-voice converter 134, such as a text-to-speech (TTS) device. The voice data may be sent as packets over the data network 122 by the network interface 130, or as voice signals over the line 123 to the PSTN 118. The voice data is sent to a voice communications device, which may be one of the telephone 104, answering device 106 or mobile telephone 108. Text messages may be sent without conversion through either the voice network gateway 132 or the network interface 130 to non-voice communications devices such as the pager 102, mobile PDA 110, or computer 114.

Figure 3:
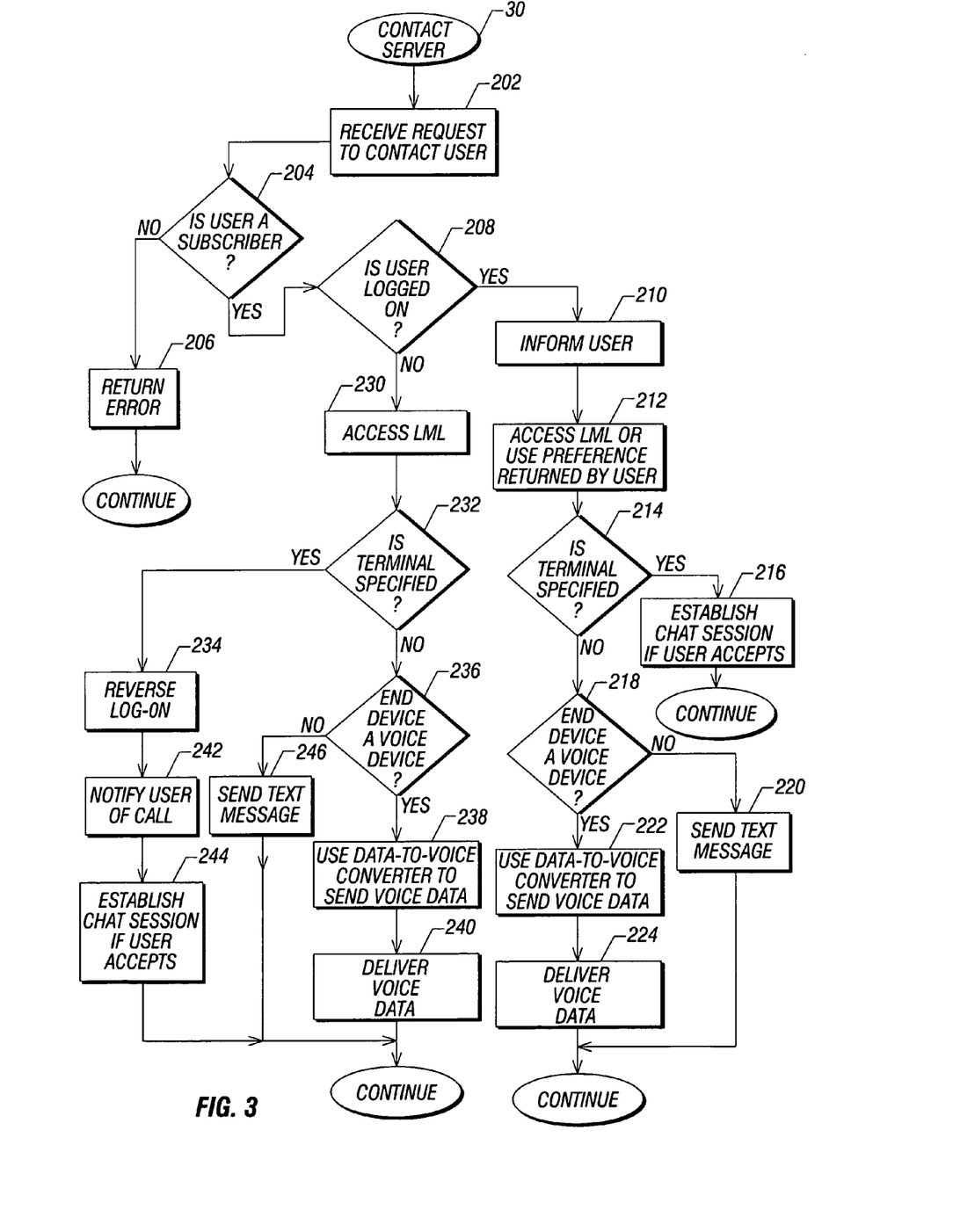
FIG. 3 is a flow diagram of a contact server application in accordance with one embodiment executable by a server operated by a service provider in the communications system of FIG. 1.

In accordance with some embodiments, the contact server 30 may be configured to select one of the multiple communications devices based on some predetermined criteria, such as user preferences. The contact server 30 forwards the message (in text form or voice form, depending on the selected device) to the communications device. Referring to FIG. 3, the process performed by the contact server 30 (or by other contact servers in other service providers) in establishing a real-time text-based messaging or communications session is illustrated. In response to receiving (at 202) a request to contact a user, such as user B in community 16, the contact server 30 determines (at 204) if the user exists and is a subscriber of the service provider 22. If not, an error is returned (at 206). If the destination user is a subscriber, then the contact server 30 may determine (at 208) if the user is logged on. The contact server 30 may determine this by checking its internal registry to see if a subscriber is logged on. If so, the contact server 30 may inform (at 210) the user through the second terminal 18. This may be in the form of a pop-up graphical user interface (GUI) or some audible tone presented at the terminal 18. The pop-up message may also include options selectable by the destination user to determine whether to accept the message at the terminal 18 or to accept the message through one or more other communications devices, such as a pager, a telephone, an answering device, a mobile telephone, a PDA, a voice over IP telephone, electronic mail, or some other communications device.

The contact server 30 next accesses (at 212) a "locate me list" (LML), such as the one in Table 1 below, to determine the types of communications devices that a destination user prefers to be contacted by. Also, by this time, the user at terminal 18 may have responded to the notification sent at 210. The user may have specified a destination device that is different from a destination device set in the LML.

The contact server 30 then determines (at 214) if the terminal (e.g., a computer) is specified. If so, the contact server 30 may establish (at 216) a text chat session if the destination user so accepts. If the communications device specified is not the terminal, then the contact server 30 determines (at 218) if the user-selected communications device is a voice device. If not, the contact server 30 sends (at 220) a text message to the target communications device. However, if the destination communications device is a voice device, then the contact server 30 uses (at 222) a data-to-voice converter to convert the text message into a voice message. The voice message is then delivered (at 224) to the target communications device, through either the voice network gateway 132 or the network interface 130 (FIG. 2).

TABLE 1

| LML (User B) | |
|---|---|
| 1$^{st}$ Choice | Chat |
| 2$^{nd}$ Choice | Telephone |
| 3$^{rd}$ Choice | Pager |
| 4$^{th}$ Choice | Voice Over IP Unit |
| 5$^{th}$ Choice | E-Mail |
| . | . |
| . | . |
| . | . |

As shown in Table 1, a user, such as user B, may specify in the LML a list of communications devices according to some predetermined order. For example, user B may specify a chat session as the most preferred type of communications when contacted by another user. The LML may also specify other communications devices in descending preference order, such as a telephone, a pager, a voice over IP unit, electronic mail, and so forth. In another embodiment, a plurality of the communications devices specified in the LML may be contacted at the same time instead of sequentially. When an attempt to establish communications with the most preferred communications device fails, the contact server 30 may go down the list to other communications devices. For example, if after some period of time, user B does not respond to an invitation to establish a chat session, the contact server 30 may go to the second entry, which is a telephone (wired or wireless). The contact server 30 then makes a call to the telephone number set in the LML through the PSTN 118. Some limit may be set on how many times the telephone may be allowed to ring. The telephone may be either picked up by user B or answered by an answering device (e.g., an answering machine or an answering service). When the contact server 30 detects that the remote telephone has been picked up, the text message that has been converted to speech is transmitted to the telephone or answering machine or service.

If, however, the preset number of rings of the telephone has been exceeded, then a failure is indicated and the contact server 30 may go to the next preferred communications device, in this example a pager. The contact server dials the telephone number of the pager. When prompted for a message by the pager service provider 116, the contact server 30 sends its numeric or text message to the pager service provider, which transmits the message to the pager. The numeric message may include the telephone number of the origination user, in this case user A. Alternatively, a text message may also be sent along with the numeric telephone number.

If an attempt to the reach the pager fails, the contact server 30 goes to the next entry of the LML, which may be a voice over IP unit. The voice over IP unit may be a telephone adapted with a network card that is capable of connecting to the data network 122, or it may be a personal computer that has been set up with speech processing capabilities. The contact server 30 calls the telephone number associated with the voice over IP unit. The call may be placed to the voice over IP unit using ringing with an H.323 compliant application (e.g., Microsoft NetMeeting) voice client. The H.323 Recommendation sets multimedia standards for the communications of audio, video, and data communications over packet-based networks, such as IP networks. H.323 is a recommendation from the International Telecommunications Union (ITU).

If the voice over IP unit answers in less than a predetermined number of rings, a text message is converted to speech and communicated over the IP network 122 to the voice over IP unit. If the call is not answered within a predetermined number of rings, then the contact server 30 moves to the next entry in the LML, in this case electronic mail. The contact server 30 then sends the text message in an electronic mail to the e-mail address of user B. The electronic mail message may be received by an e-mail receiver, which may be any terminal that the user can use to gain access to his e-mail server. Additional choices may be available in the LML.

The foregoing describes a scenario where user B (the destination user) is logged onto the service provider of his or her community. If user B is not logged on (as determined at 208), then the contact server 30 accesses (at 230) the LML to determine the desired order of communications devices. Another option is that plural communications devices may be contacted at the same time. Using Table 1 as an example, the first choice is a chat session. Because the user is not logged on, a chat session cannot currently be established. However, the LML may also specify if a reverse log-on procedure may be performed onto user B's computer. User B may specify who may initiate a reverse log-on to his or her personal computer. Such preferences may be stored as part of the LML or in a separate database that is accessible by the service provider 22. The reverse log-on to user B's personal computer may be performed by the service provider dialing back into user B's computer, setting up a PPP (point-to-point) connection, assigning an IP address, and presenting user A's contact request to user B. PPP is described in RFC 1661, entitled "The Point-to-Point Protocol (PPP)," dated June 1994.

If reverse log-on is enabled, the chat server 30 determines (at 232) if user B's terminal is specified as the most preferred choice in user B's LML. If so, the chat server 30 performs a reverse log-on (at 234) to user B's terminal. User B is then notified (at 242) of the call request at his or her terminal. If the user accepts, a chat session is established (244) between user A and user B.

If reverse log-on is not enabled or if user B's terminal is not specified as the most preferred choice in the LML (as determined at 232), then the contact server 30 determines (at 236) if the communications device is a voice device. If not, the contact server 30 sends (at 246) a text message to the communications device. If the communications device is a voice device, then the contact server 30 uses (at 238) a data-to-voice converter to convert the text message into voice data. The voice data is then delivered (at 240) to the selected communications device.

Figure 4:
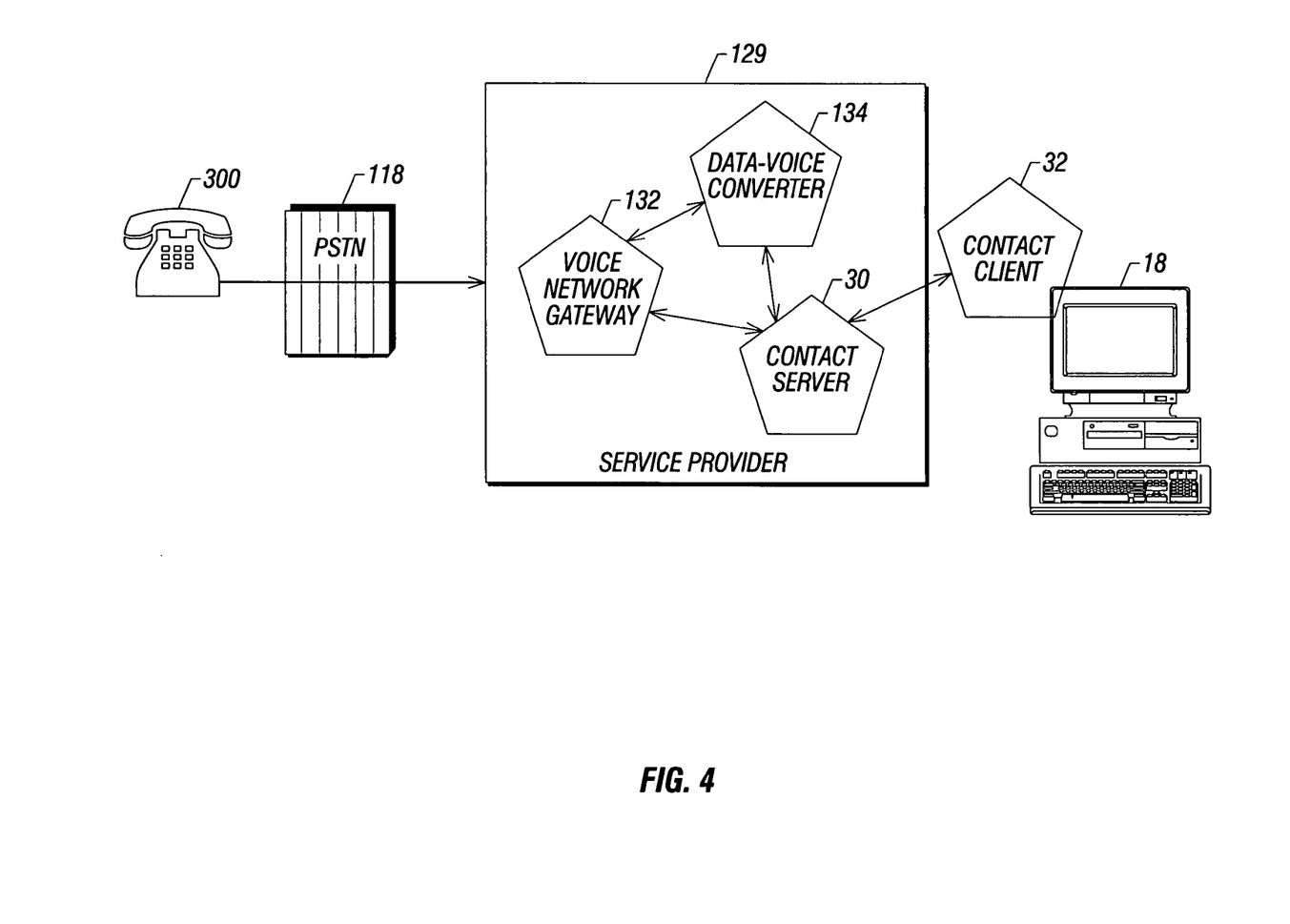
FIG. 4 illustrates a communications system in which a telephone may be used to message a user located at a terminal.

Referring to FIG. 4, an originating user such as user A can use a telephone 300 to contact user B at his or her terminal 18. User A can dial a predetermined telephone number, which is routed by the PSTN 118 to the system 129 associated with the service provider 22 of user B. Once a connection is established through the PSTN 118, user B may speak into the telephone 300, with the voice data passed through the PSTN 118 to the voice network gateway 132. The voice network gateway 132 communicates the voice data to the data-to-voice converter 134, which converts the voice data into one or more data messages (e.g., text messages). The text messages are passed to the contact server 30, which in turn communicates the text messages to the contact client 32 located in the terminal 18 of user B. Thus, as the user speaks into the telephone 300, a text message may appear on user B's terminal. User B may then respond by typing in a text message, which is sent in the reverse path back through the system 129 and PSTN 118 as voice back to the telephone 300. A real-time text-based communications session can thus be established between a user at a telephone on one end and a user at a text-based terminal on the other end. In this example, the text-based communications session is part of an overall communications session that also includes voice at one end.

In the FIG. 4 example, the contact server 30 may also be capable of routing the call from user A to another communications device as specified by the LML of user B. Thus, for example, the contact server 30 may direct user A's call to an answering device, a pager, or even an electronic mail, as discussed above.

Embodiments of messaging methods and systems have been described that allow a user located in a first community to call or contact a user located in a second community to establish a real-time text-based messaging or communications session. Further, some embodiments allow a service provider to route a contact request to communications devices other than a terminal that the destination user is sitting at. Such routing to an alternative device may be according to destination user preferences. For example, the user may specify a list of communications devices in some preference order. As a result, when a user is contacted, a service provider may attempt to contact the destination user according to the list of preferences. This allows a user to be contacted even if the user is not sitting at his or her computer.

Another aspect of some embodiments of the invention is the ability to establish text-based chat or messaging sessions across different communities. To establish a chat or messaging session, several architectural solutions may be available. For example, in a first architecture (a distributed architecture), chat applications may be available on servers of all service providers. A chat application refers to a set of software and hardware components that enable a user to participate in a text-based chat or messaging session.

A second, alternative architecture includes chat applications residing on computers or other terminals of all users involved in the chat or messaging session. Another architecture includes chat applications residing on servers of all involved service providers combined with a third party server that mixes the inter-service provider chat or messaging sessions. Another architecture includes chat applications residing on the servers of either the origination or termination service provider (but not both). The servers referred to may be part of the contact servers described in connection with FIG. 1.

Figure 5:
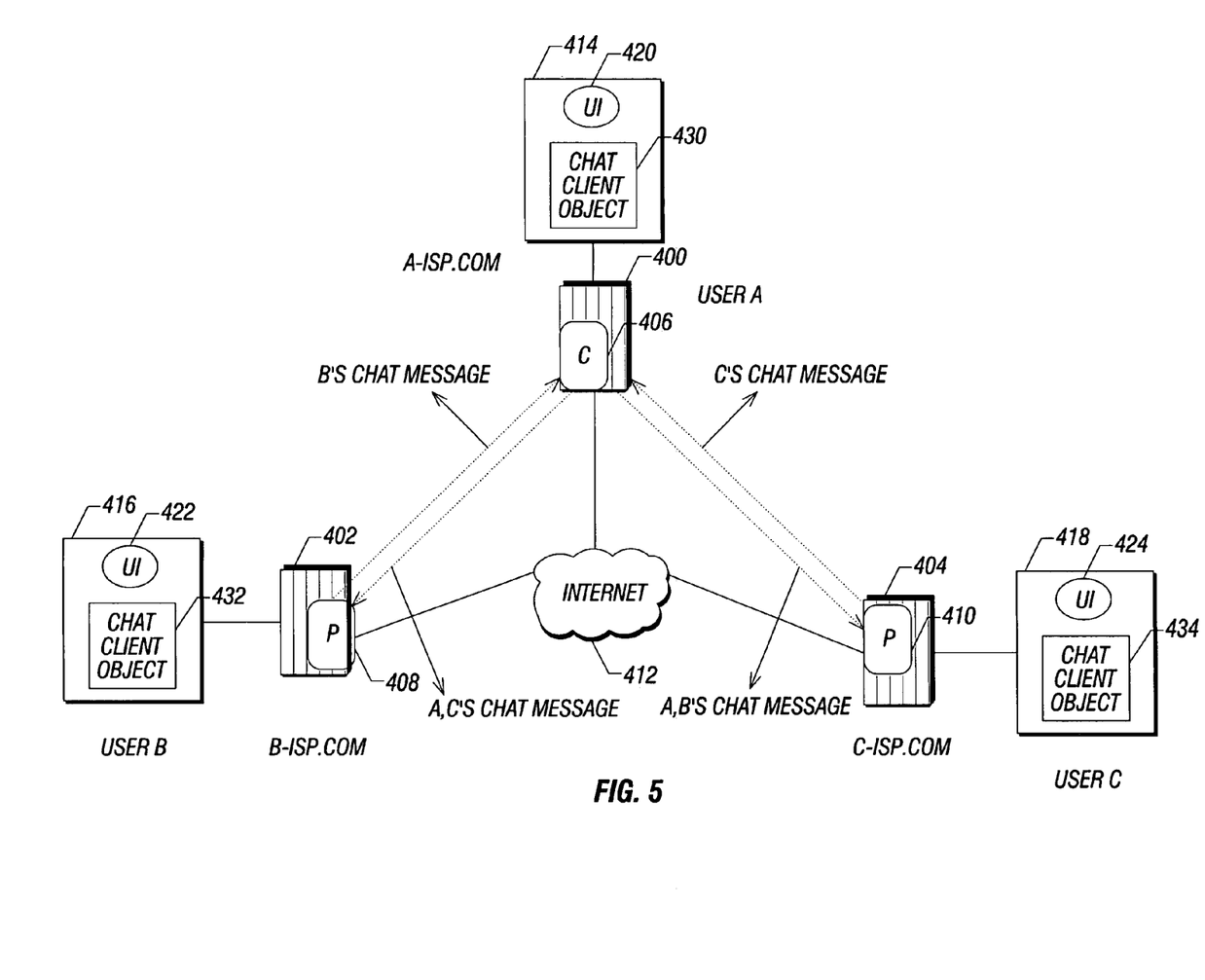
FIG. 5 is a block diagram of entities involved in establishing and maintaining text chat sessions between a plurality of users according to a distributed architecture.

Referring to FIG. 5, a distributed architecture for establishing chat sessions between multiple users (users A, B, and C illustrated) include chat applications provided in each of servers 400, 402, and 404, respectively, of service providers associated with users A, B, and C, respectively. Reference to chat sessions is meant to include any type of communications sessions in which some form of text or other visual data (including images) are exchanged between terminals. The service providers associated with users A, B, and C are referred to here as service providers A, B, and C, respectively. The servers 400, 402, and 404 are coupled through a network 412, which may include the Internet and/or intranets. For each initiated text chat session, a chat session object is created containing the details (e.g., service provider domain, chat identifiers, preferences) of the participating members. In one embodiment, there is one chat session object per server. The chat session objects are indicated as 406, 408, and 410 on servers 400, 402, and 404, respectively. Each chat session object is assigned a unique object ID.

A chat session object sends the text message of one or more participating members to a designated port at each of the other service provider domains involved with the chat session. The chat session object includes the identifiers (IDs) of the users involved in the chat session in a given community (also referred to as the domain of the service provider). The combination of a user ID and a domain ID (e.g., A@A-ISP.COM, B@B-ISP.COM) uniquely identifies a user. Thus, for example, the chat session object 406 maintains a list of users, which may include A@A-ISP.COM plus any other user located in the community provided by service provider A (having a domain ID A-ISP.COM). The other chat session objects 408 and 410 maintain similar lists for communities that those servers are associated with. Each chat session object handles incoming chat messages and sends outgoing chat messages.

The chat session object presents the incoming chat message as coherent dialog to a client chat user interface on the terminal of each participating user. In the illustrated embodiment of FIG. 5, client chat user interfaces 420, 422, and 424 are provided on terminals 414, 416, and 418, respectively, of users A, B, and C.

The chat session objects 406, 408, and 410 in the illustrated embodiment are configured as one of two objects: a controller chat session object or a participating chat session object. The chat session object that initiated the chat session may be designated as the controller object while the other chat session objects are designated as participating objects. In the illustrated embodiment of FIG. 5, user A is the origination user. Thus, the chat session object 406 is designated as the controller object, while the chat session objects 408 and 410 in servers 402 and 404 are designated as participating objects.

The controller object 406 is responsible for aggregating incoming text messages from all of the participating objects and broadcasting the resulting message stream to the participating objects. The controller object 406 keeps a list of all participating objects that are involved in the chat session. A participating object sends chat messages to, and receives chat messages from, the controller object. Participating objects are unable to send chat messages directly to each other. When a participating chat session object does not have any user in its user list, that session object sends a message to the controller object to remove it from the controller object's participating object list and destroys itself. Alternatively, the participating chat session object may be removed by the controller object, or the participating object may be left dormant without being destroyed.

In further embodiments, the segregation of tasks between controller and participating objects may be eliminated. Thus, each chat session object may perform the same tasks as all other objects to achieve an even more distributed architecture in which any two chat session objects may communicate directly with each other (instead of through a controller object) through the network 412.

The chat session objects exchange chat application messages to carry the text messages between users. A chat application message has an address part and a data part. The address part has the unique object ID of the destination chat session object and the data part has the actual text message that the chat members send to each other. When a chat session object receives an incoming message, it extracts the text portion (the data part) from the incoming message and transmits it to all of the users currently in that session within its domain or community.

Figure 6:
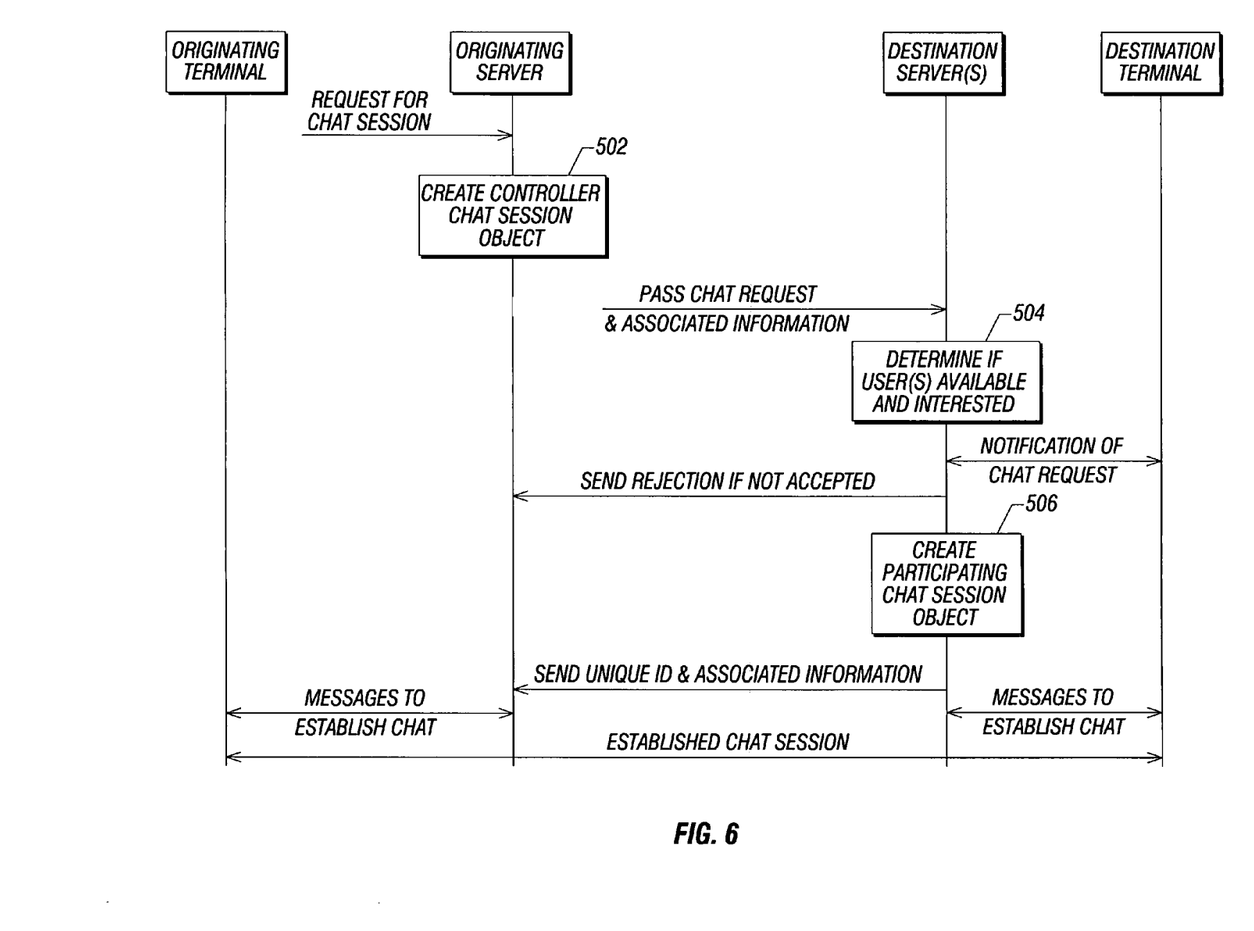
FIG. 6 illustrates a flow of messages exchanged between entities of FIG. 5.

Referring to FIG. 6, a flow sequence for establishing a chat session is illustrated. An originating server listens at a predetermined port for chat requests from an originating terminal. If a chat request is received at the originating server, a controller chat session object is created (at 502) on the originating server with a unique object ID and domain ID. The chat request along with associated information is then passed to a destination server or servers identified in the request. The associated information includes the destination user names, the object ID and domain ID of the originating server, and domain ID of each destination chat session object. Each destination server then determines (at 504) if the identified users exist, are available (logged on), and interested in the requested chat session. The destination server may send a notification of the chat request to the destination terminal (if the user is on-line), which may respond with a message indicating acceptance or rejection of the request. If the destination user does not exist, is unavailable, or has rejected the chat request, the destination server sends some form of a rejection message back to the originating server.

However, if the request is accepted by the destination server, then the destination server creates (at 506) a participating chat session object. The unique object ID and domain ID of the participating chat session object is sent back to the controller chat session object. After messages are exchanged between the servers and each of their corresponding terminals, a chat session has been successfully created. In the established chat session, chat messages are communicated among the terminals through the chat session objects.

In an alternative arrangement, a participating chat session object may be created upon receipt of the request. The participating object then determines if users are available or not.

A second type of architecture includes chat client applications residing on the terminals of involved users instead of on the service provider servers 400, 402, and 404. Each chat client creates an object associated with an initiated chat session, similar to chat objects created by the servers in the embodiment of FIG. 5. Each client chat object checks the incoming chat data to see whether it is addressed to it and decodes the message and presents it to the chat client user interface. As with the server chat objects in the FIG. 5 embodiment, the client chat objects may be designated as a controller object and one or more participating objects. Alternatively, the "controller" and "participating" destination of the client chat objects may be eliminated to allow client chat objects to communicate directly with each other instead of through a controller object.

Figure 7:
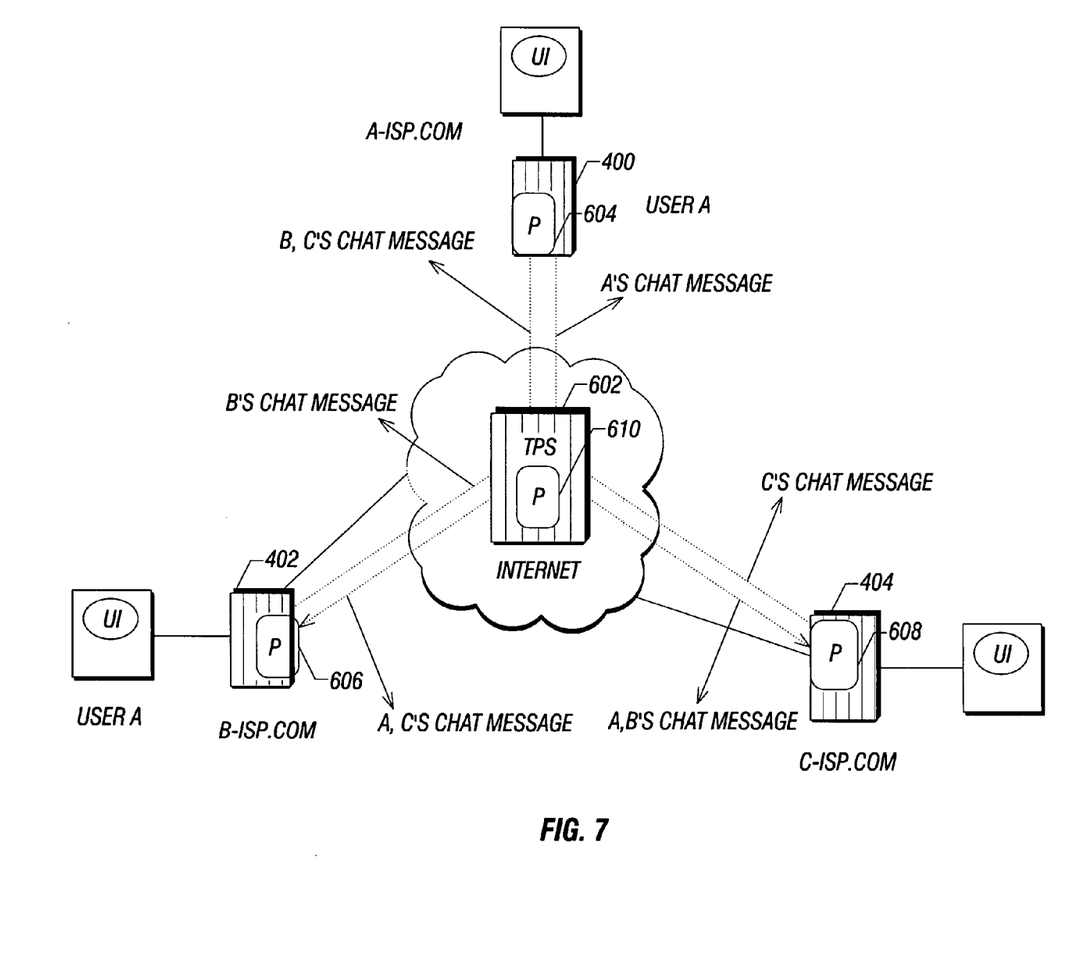
FIG. 7 is a block diagram of entities involved in establishing and maintaining text that sessions between a plurality of users according to a centralized architecture.

Referring to FIG. 7, a centralized architecture is provided in which a third party or central server 602 cooperates with servers associated with the several service providers A, B, and C to establish a chat session between inter-community terminals. An advantage of using the centralized architecture is that complexity of inter-domain chat systems is reduced, as compared to the FIG. 5 architecture. For each text chat session, a controller chat session object 610 is created in the central server 602 that has the details of all participating members in the chat session. The controller chat session object in the central server 602 functions as a chat exchange controller. Chat session objects (participating objects) are also created in each server involved in the chat session. The chat exchange controller processes incoming chat messages from a participating chat object and routes them to the other participating chat objects.

Service providers connect to the domain provided by the central server 602 to retrieve chat messages on a per-chat session basis and each presents chat messages to end users in their respective domains. The chat session objects created in each of the servers 400, 402, and 404 are participating objects, regardless of which user initiated the chat session.

Figure 8:
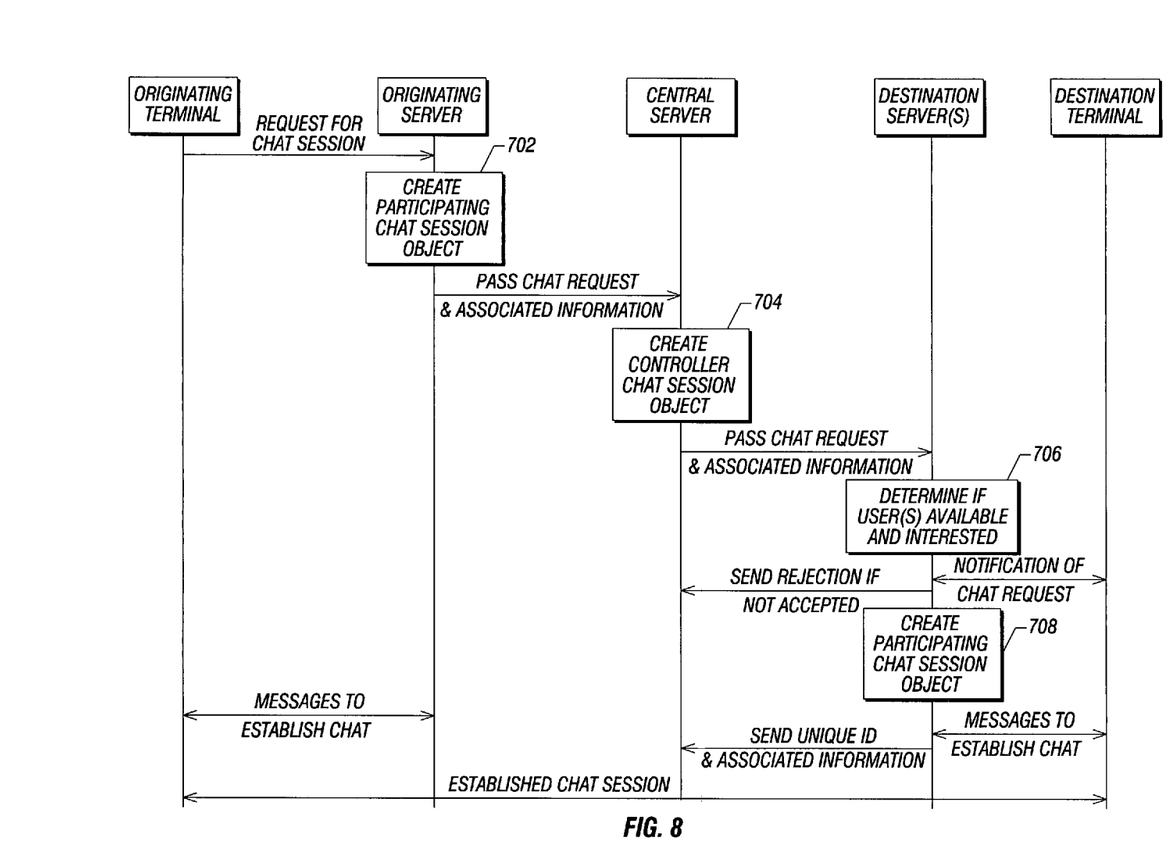
FIG. 8 illustrates a flow of messages exchanged between entities of FIG. 7.

Referring to FIG. 8, the flow sequence for establishing a chat session between an originating server and one or more destination servers is illustrated. An originating server listens at a predetermined port for a request for a chat session from an originating terminal. When a chat session request is received, the originating server creates (at 702) a participating chat session object that has a unique object ID. The originating server then passes the chat request and associated information to the central server. The associated information includes the object ID, the domain ID, the destination domain names, and a list of destination users. On receipt of the request, the central server 602 creates a controller chat session object (at 704). The central server 602 then passes the chat request along with associated information to each destination domain named in the incoming request from the originating server. The associated information includes the user names in the destination servers along with the object ID of the controller chat session object.

Upon receiving the request from the controller object in the central server 602, each of the one or more destination servers determines (at 706) whether at least one user in the request exists, is available, and is interested in a chat connection. If the user does not exist, is unavailable, or is not interested, then the destination server may respond with a rejection message. Messages may be exchanged with the destination terminal to determine user interest. If at least one user is available and interested, then the request is considered successful. The destination server then creates (at 708) a participating chat session object. The chat object of each destination server then sends its object ID and associated information back to the central server 602, addressed to the controller object.

After messages between servers and corresponding terminals have been exchanged to establish the chat session, a chat session is created in which the controller object in the server 602 providing a common interface through which the participating chat objects pass chat messages. A distinction of the central server 602 in accordance with some embodiments and a chat server of conventional systems is that users do not have to log-on or otherwise create an explicit link with the central server 602 to establish a chat session. The controller object in the server 602 is transparent to users at the terminals. Instead, it is the cooperation of chat session objects in the central server 602 and the other servers which provides the chat link.

The foregoing architectures assume that all service providers have application servers capable of establishing chat sessions. However, in some arrangements, this may not be true. An alternative architecture is defined to provide chat conferencing facilities for users associated with service providers that do not have chat applications. In this alternative arrangement, such users may establish a chat connection by using a web browser.

Figure 9:
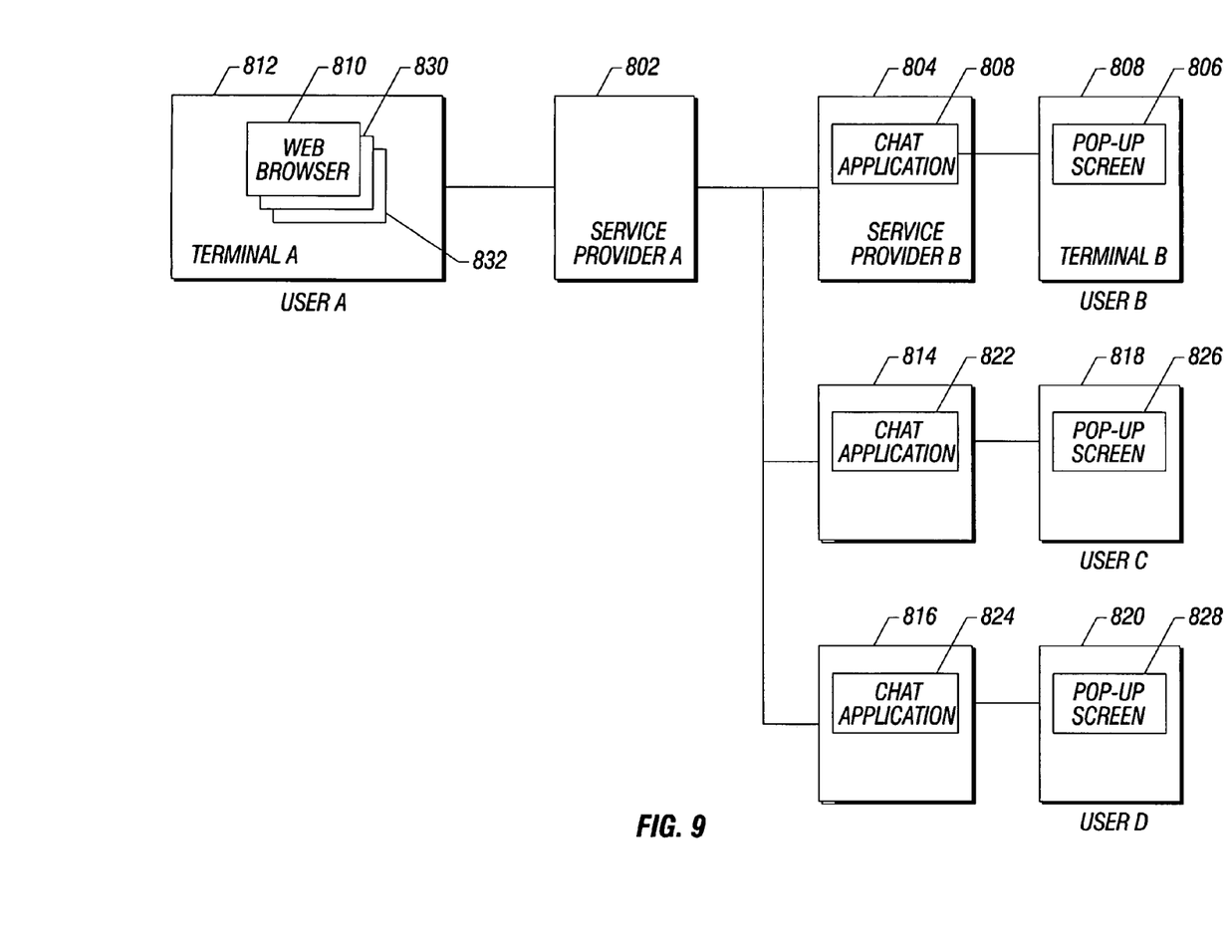
FIG. 9 illustrates a communications system in which a server associated with the originating service provider does not include a chat application.

Referring to FIG. 9, an example arrangement of this alternative is illustrated in which the service provider 802 associated with user A does not have a chat application while the service provider 804 associated with user B does have a chat application. User A may request contact with user B, as described above in connection with FIGS. 1–4. A pop-up screen 806 may be displayed in a terminal 808 at which user B is sitting. If user B presses a button on the pop-up screen 806 to accept a text-based chat session, then the following tasks may occur to enable a chat session between users A and B even though user A does not have access to a chat facility. The chat application 808 of the service provider 804 triggers a response to user A's contact request that opens a new web browser window 810 in the terminal 812 that user A is using. In an alternative embodiment, instead of a new web browser window, an existing web browser window may be updated with a web page to allow the user access to the chat session. The web browser 810 invites user A to participate in a chat session with user B. In this arrangement, the service provider 802 that user A is associated with does not need a chat application since the chat session is being provided by the chat application 808 of user B's service provider 804.

The example given above illustrates a point-to-point chat session. In another example arrangement, a multi-point chat session may be established. Thus, in one example, user A may desire to establish a multi-point chat session with users B, C, and D. User A, as discussed above, is logged onto a service provider 802 that does not provide a chat facility. User A (A@A-ISP.COM) may request contact with the following users: B@B-ISP.COM, C@C-ISP.COM, and D@D-ISP.COM. A pop-up screen 806, 826, or 828 on terminal 808, 818, or 820 announces that user A would like to contact user B, C, or D, respectively. If each of users B, C, and D presses a button on the pop-up screens 806, 826, and 828 to accept the chat session, the chat servers at service providers 804, 814, 816 may trigger responses that open respective web browsers 810, 830, and 832 to invite user A to participate in chat sessions with users B, C, and D. Alternatively, instead of multiple web browsers, a web browser window may be configured into multiple sections, one for each destination user.

Figure 10:
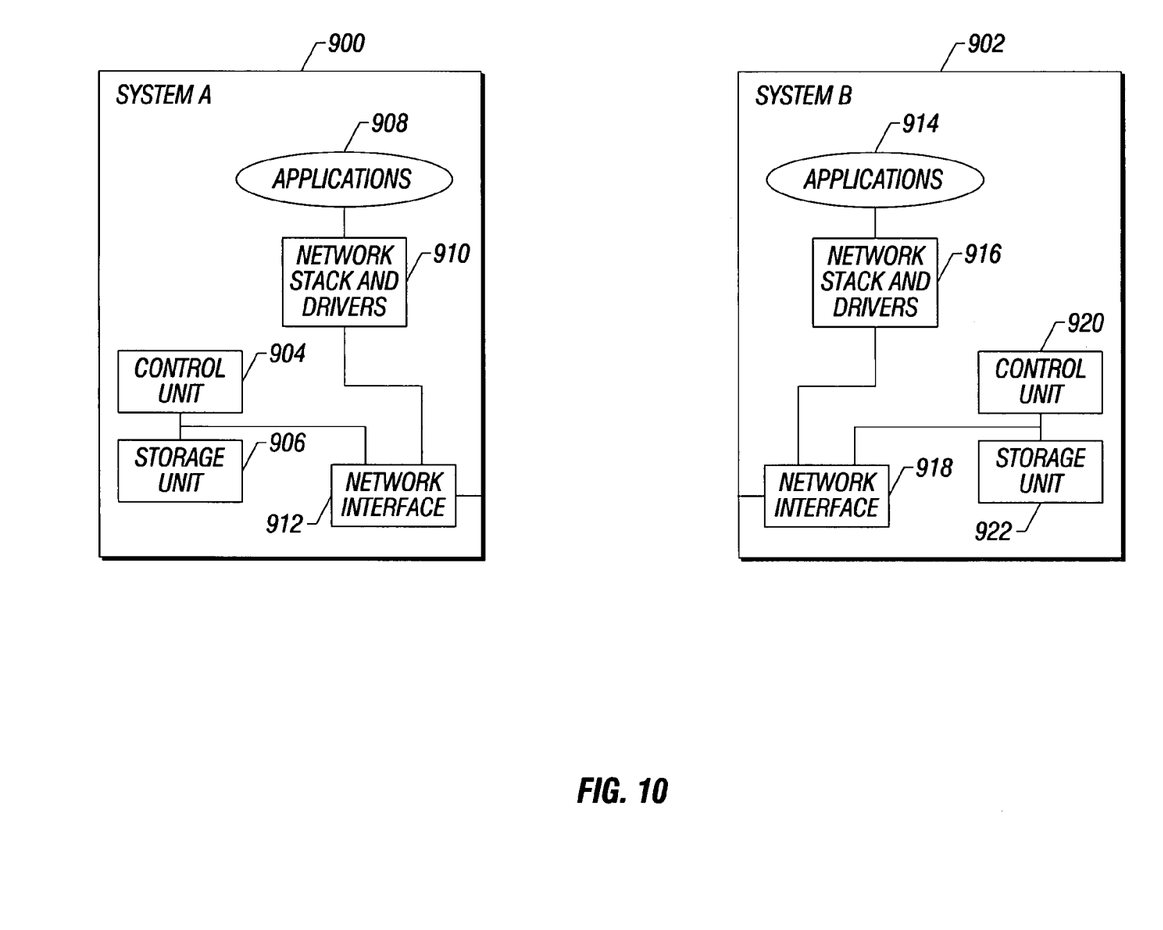
FIG. 10 is a block diagram of components in various entities involved in communications sessions according to various embodiments.

Referring to FIG. 10, example components of servers or terminals in the communications systems described above are illustrated. Each server or terminal (referred to generically as a system) includes software application routines or modules 908 and 914, respectively. The application routines or modules include the various messaging and chat routines or modules described above. The application routines or modules 908 or 914 may communicate over a network through network stack and driver layers (910 and 916) and network interfaces (912 and 918). The network stack may include a TCP/IP (Transmission Control Protocol/Internet Protocol stack). A network interface may include a network controller or network controller card. The software routines and modules in each system 900 or 902, including applications 908 or 914, may be executable on a control unit 904 or 920. A storage unit 906 or 922 is also included in each system to store data and instructions (e.g., instructions of the routines and modules for performing tasks associated with chat sessions).

Each control unit 904 or 920 may include one of the following components: microprocessors, microcontrollers, processor cards (including one or more microprocessors or microcontrollers), and other control or computing devices. Each storage unit 906 or 922 may include machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital video discs (DVDs). Instructions that make up the various software routines or modules in each system may be stored in each respective storage unit. The instructions when executed by a respective control unit cause the respective system to perform programmed acts.

The instructions of the software routines or modules may be loaded or transported into a system in one of many different ways. For example, code segments including instructions stored on floppy disks, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments including instructions to the system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communicating in a network having a plurality of communities each including a server, the method comprising:

receiving, from the server in a first community associated with a first service provider, a request indicating desired real-time, text-based messaging from a first terminal coupled to the first community server to a second terminal coupled to the server in a second community associated with a second, different service provider;

processing the request, by the server in the second community, to establish a real-time, text-based messaging session between the first and second terminals through the first and second community servers;

determining if the second terminal has an established link with the second community server; and sending a message to a predetermined communications device other than the second terminal if the second terminal does not have an established link with the second community server.

2. The method of claim 1, further comprising sending a notification to the second terminal of the desired messaging session if the second terminal has an established link with the second community server.

3. The method of claim 2, further comprising receiving an indication from the second terminal of whether the desired messaging session has been accepted.

4. The method of claim 1, wherein sending the message to the predetermined communications device includes sending to a communications device including at least one of a telephone, a pager, and an electronic mail receiver.

5. A method of communicating in a network having a plurality of communities each including a server, the method comprising:

receiving, from the server in a first community associated with a first service provider, a request indicating desired real-time, text-based messaging from a first terminal coupled to the first community server to a second terminal coupled to the server in a second community associated with a second, different service provider;

processing the request, by the server in the second community, to establish a real-time, text-based messaging session between the first and second terminals through the first and second community servers;

determining if the second terminal has an established link with the second community server; and performing a reverse log on to the second terminal if the second terminal does not have an established link with the second community server.

6. The method of claim 5, further comprising establishing a chat session between the first and second terminals.

7. The method of claim 5, wherein receiving the request comprises receiving a request indicating a desired interactive, text-based chat session.

8. The method of claim 5, further comprising providing a web page for display at the first terminal, wherein receiving the request comprises receiving a message generated in response to a selection made in the web page.

9. The method of claim 5, further comprising:

providing a session object in the second community server, wherein receiving the request comprises receiving a request at the session object in the second community server from another session object in the first community server; and the session object in the second community server exchanging messaging with the first community server to establish the real-time, text-based messaging session.

10. A server for use in a communications system having a plurality of communities coupled by a network, each community associated with a different service provider, the server being associated with a first one of the communities and comprising:

an interface unit adapted to receive a contact request over the network from an entity associated with another community, the entity not logged on to the server, the contact request indicating a request to establish a text-based messaging session with a destination terminal linked to the server; and a controller adapted to send a notification to the destination terminal of the contact request and to receive an indication from the destination terminal of acceptance of the contact request if the destination terminal is logged on;

the controller to send a message to an alternative communications device other than the destination terminal if the destination terminal is not logged on.

11. An article including one or more machine-readable storage media containing instructions for establishing a text-based messaging session between subscribers in a plurality of communities, each community associated with a different service provider, the instructions when executed causing a system in a first community associated with a first service provider to:
- receive a request from a subscriber in a second community associated with a second service provider, the request indicating a desired text-based messaging session with a subscriber in the first community;
- determine if the subscriber in the first community is logged on to the first service provider;
- notify the subscriber in the first community of the request if the subscriber in the first community is logged on;
- determine if the subscriber in the first community has accepted the request;
- establish the text-based messaging session between the subscribers if the subscriber in the first community accepted; and
- send a message to an alternative destination in response to determining that the subscriber in the first community is not logged on.

12. The article of claim 11, wherein the one or more storage media contain instructions that when executed cause the system to further send signaling to establish the text-based messaging session.

13. The article of claim 11, wherein the text-based messaging session includes a chat session.

14. The article of claim 11, wherein the one or more storage media contain instructions that when executed cause the system to create a controller object adapted to control the text-based messaging session.

15. The article of claim 11, wherein the one or more storage media contain instructions that when executed cause the system to:
- receive a request from a subscriber in a third community associated with a third service provider for a text-based messaging session; and
- establish the text-based messaging session among the subscribers in the first, second, and third communities.

16. The article of claim 11, wherein the instructions when executed cause the system to establish the text-based messaging session by establishing an interactive, text-based chat session.

17. The article of claim 11, wherein the instructions when executed cause the system to receive the request at a first server in the system from a second server in the second community.

18. The article of claim 17, wherein the instructions when executed cause the system to:
- provide a session object in the system; and
- cause the session object to exchange messaging with the second server to establish the text-based messaging session.

19. A server for use in a communications system having a plurality of communities coupled by a network, each community associated with a different service provider, the server being associated with a first one of the communities and comprising:
- an interface unit adapted to receive a contact request over the network from an entity associated with another community, the entity not logged on to the server, the contact request indicating a request to establish a text-based messaging session with a destination terminal linked to the server; and
- a controller adapted to send a notification to the destination terminal of the contact request and to receive an indication from the destination terminal of acceptance of the contact request;
- wherein the controller is adapted to further send messaging to perform a reverse log-on procedure with the destination terminal.

20. The server of claim 19, wherein the interface unit is adapted to receive the contact request from a second server in the other community.

21. A method of communicating in a network having a plurality of communities each including a server, the method comprising:
- receiving, from the server in a first community associated with a first service provider, a request indicating desired real-time, text-based messaging from a first terminal coupled to the first community server to a second terminal coupled to the server in a second community associated with a second, different service provider;
- processing the request, by the server in the second community, to establish a real-time, text-based messaging session between the first and second terminals through the first and second community servers;
- providing a response, from the second community server, to the first terminal to present a web page in a web browser on the first terminal; and
- receiving a text message of the real-time, text-based messaging session originated from the web browser on the first terminal.

22. A server for use in a communications system having a plurality of communities coupled by a network, each community associated with a different service provider, the server being associated with a first one of the communities and comprising:
- an interface unit adapted to receive a contact request over the network from an entity associated with another community, the entity not logged on to the server, the contact request indicating a request to establish a text-based messaging session with a destination terminal linked to the server; and
- a controller adapted to send a notification to the destination terminal of the contact request and to receive an indication from the destination terminal of acceptance of the contact request;
- wherein the controller is adapted to communicate a web page for display on the entity;
- the contact request comprising a message generated in response to user selection made in th web page at the entity.

23. The server of claim 22, wherein the text-based messaging session comprises an interactive, text-based chat session.

24. The server of claim 22, wherein the controller comprises a session object,
- the session object adapted to exchange messaging with another session object in a second server in the other community to establish the text-based messaging session.

25. The server of claim 22, wherein the controller is adapted to communicate a response to the contact request to present a web page in a web browser at the entity,
- the interface unit adapted to further receive text messaging from the web browser at the entity during the text-based message session.

26. An article including one or more machine-readable storage media containing instructions for establishing a text-based messaging session between subscribers in a plurality of communities, each community associated with a different service provider, the instructions when executed causing a system in a first community associated with a first service provider to:

receive a request from a subscriber in a second community associated with a second service provider, the request indicating a desired text-based messaging session with a subscriber in the first community;

notify the subscriber in the first community of the request;

determine if the subscriber in the first community has accepted the request;

establish the text-based messaging session between the subscribers if the subscriber in the first community accepted,     wherein the request is received at a first server in the system from a second server in the second community; and     provide a web page for display at a subscriber terminal in the second community,     wherein the request received at the first server comprises messaging generated in response to selection made in the web page displayed at the subscriber terminal in the second community.

27. The article of claim 26, wherein the instructions when executed cause the system to further:

communicate, in response to the request, a web page for display in a web browser at a subscriber terminal in the second community; and     receive messaging from the web browser during the text-based messaging session.

* * * * *